United States Patent
Johnson (10) Patent No.: US 9,225,919 B2
(45) Date of Patent: Dec. 29, 2015

(54) IMAGE SENSOR SYSTEMS AND METHODS FOR MULTIPLE EXPOSURE IMAGING

(71) Applicant: Semiconductor Components Industries, LLC, Phoenix, AZ (US)

(72) Inventor: Richard Scott Johnson, Boise, ID (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 102 days.

(21) Appl. No.: 14/189,859

(22) Filed: Feb. 25, 2014

(65) Prior Publication Data

US 2015/0244950 A1 Aug. 27, 2015

(51) Int. Cl.
| | |
|---|---|
| H04N 5/232 | (2006.01) |
| H04N 5/353 | (2011.01) |
| H04N 5/378 | (2011.01) |
| H04N 5/235 | (2006.01) |
| H04N 5/225 | (2006.01) |

(52) U.S. Cl.
CPC ........... *H04N 5/3535* (2013.01); *H04N 5/2257* (2013.01); *H04N 5/2353* (2013.01); *H04N 5/23216* (2013.01); *H04N 5/23245* (2013.01); *H04N 5/378* (2013.01)

(58) Field of Classification Search
CPC . H04N 5/3532; H04N 5/3535; H04N 5/2329; H04N 5/2353; H04N 5/351; H04N 5/37452
See application file for complete search history.

(56) References Cited

U.S. PATENT DOCUMENTS

| | | | | |
|---|---|---|---|---|
| 7,538,307 | B1* | 5/2009 | Lauxtermann | 250/207 |
| 8,026,966 | B2* | 9/2011 | Altice | 348/294 |
| 2002/0149693 | A1* | 10/2002 | Tantalo et al. | 348/362 |
| 2010/0013973 | A1* | 1/2010 | Adkisson et al. | 348/308 |
| 2013/0044247 | A1* | 2/2013 | Kawahito et al. | 348/296 |
| 2014/0320718 | A1* | 10/2014 | Fan | 348/308 |

FOREIGN PATENT DOCUMENTS

| | | |
|---|---|---|
| WO | 9909737 | 2/1999 |
| WO | 0052926 | 9/2000 |

OTHER PUBLICATIONS

Agranov et al., U.S. Appl. No. 14/012,403, filed Aug. 28, 2013.
Velichko et al., U.S. Appl. No. 14,157,492, filed Jan. 16, 2014.

* cited by examiner

*Primary Examiner* — James Hannett
(74) *Attorney, Agent, or Firm* — Treyz Law Group, P.C.; Joseph F. Guihan (57) ABSTRACT

An imaging device may capture a composite image from multiple individual exposures. In each imaging pixel in the imaging device, charge accumulated from each of the individual exposures may be accumulated onto a storage node. The accumulated charge from all of the individual exposures in a single composite image may be read out from the storage node. The individual exposures may be separated by delay periods. The lengths of the individual exposures and delay periods may be determined automatically or set by a user such that each individual exposure is substantially free of motion blur, while the composite image illustrates a moving subject in multiple positions.

19 Claims, 5 Drawing Sheets

IMAGE SENSOR SYSTEMS AND METHODS FOR MULTIPLE EXPOSURE IMAGING

BACKGROUND

The present invention relates to imaging devices, and, more particularly, to image sensor systems and methods for multiple exposure imaging.

Modern electronic devices such as cellular telephones, cameras, and computers often use digital image sensors. Imagers (i.e., image sensors) often include a two-dimensional array of image sensing pixels. Each pixel typically includes a photosensor such as a photodiode that receives incident photons (light) and converts the photons into electrical signals.

In conventional imaging systems, a digital image sensor captures an image over a single continuous exposure. The length of the time of that exposure is generally referred to as an integration time. Generally, a digital imaging sensor determines the level of ambient light in a scene prior to capturing an image of that scene. The digital image sensor then adjusts its sensitivity (e.g., adjusts the gain of image sensing pixels, image readout circuitry, etc.) and sets the integration time. The integration time is set low enough that any moving objects in the scene are imaged clearly and without substantial motion blur. In many situations, however, motion artifacts are desirable.

It would therefore be desirable to be able to provide improved image sensor systems and methods.

DETAILED DESCRIPTION

Figure 1:
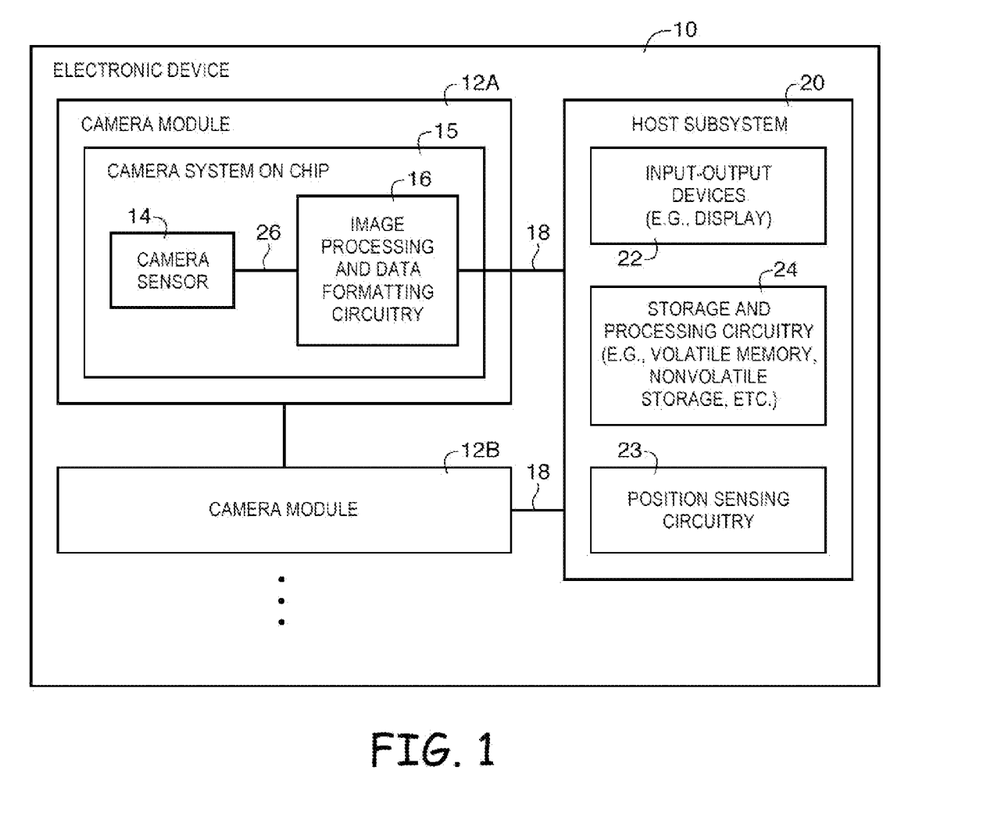
FIG. 1 is a diagram of an electronic device and computing equipment that may include an image sensor system with adjustable multiple exposure capabilities in accordance with embodiments of the present invention.

Digital camera modules are widely used in electronic devices. An electronic device with a digital camera module is shown in FIG. 1. Electronic device 10 may be a digital camera, a laptop computer, a display, a computer, a cellular telephone, or other electronic device. Device 10 may include one or more imaging systems such as imaging systems 12A and 12B (e.g., camera modules 12A and 12B) each of which may include one or more image sensors 14 and corresponding lenses. During operation, a lens focuses light onto an image sensor 14. The lens may have fixed aperture. The pixels in image sensor 14 include photosensitive elements that convert the light into digital data. Image sensors may have any number of pixels (e.g., hundreds or thousands or more). A typical image sensor may, for example, have millions of pixels (e.g., megapixels). In high-end equipment, sensors with 10 megapixels or more are not uncommon. In at least some arrangements, device 10 may include two (or more) image sensors 14, which may capture images from different perspectives. When device 10 includes two image sensors 14, device 14 may be able to capture stereo images.

Still and video image data from camera sensor 14 may be provided to image processing and data formatting circuitry 16 via path 26. Image processing and data formatting circuitry 16 may be used to perform image processing functions such as adjusting white balance and exposure and implementing video image stabilization, image cropping, image scaling, etc. Image processing and data formatting circuitry 16 may also be used to compress raw camera image files if desired (e.g., to Joint Photographic Experts Group or JPEG format).

In some arrangements, which is sometimes referred to as a system on chip or SOC arrangement, camera sensor 14 and image processing and data formatting circuitry 16 are implemented as a common unit 15 (e.g., on a common integrated circuit, or stacked together). The use of a single integrated circuit to implement camera sensor 14 and image processing and data formatting circuitry 16 can help to minimize costs. If desired, however, multiple integrated circuits may be used to implement circuitry 15. In arrangements in which device 10 includes multiple camera sensors 14, each camera sensor 14 and associated image processing and data formatting circuitry 16 can be formed on a separate SOC integrated circuit (e.g., there may be multiple camera system on chip modules such as modules 12A and 12B).

To save space and simplify assembly by a manufacturer of a camera or other electronic device in which imaging capabilities are desired, it may be desirable to stack a processor (e.g., processing circuitry 16, or a processor in camera sensor 14) and an imager (e.g., camera sensor 14) to form a preassembled image sensor unit 15. An image sensor unit 15 that is formed in this way has the image sensing capabilities of the imager and the processing capabilities of the processor in a single component. Additionally, in arrangements in which the processor 16 (sometimes referred to herein as an image co-processor iCP) has a smaller area than the imager 14, forming the processor 16 on a separate wafer may decrease the cost of the processor 16, by allowing more processors 16 to be formed on each wafer. Moreover, processors 16 and imagers 14 may be formed on different types of wafers, each of which may be optimized for their respective use. As an example, a wafer of image co-processors 16 may be optimized for analog circuitry (to optimize the performance of analog circuitry in the image co-processors such as sample and hold circuitry, line buffers, and analog-to-digital converters) or digital circuitry (to optimize the performance of digital circuitry in the image co-processors such as image formatting circuitry). Meanwhile, the imager wafer may be optimized for optical performance. Optimization of wafers for analog, digital, and/or optical performance may involve altering the materials and methods used in forming completed wafers and the design and arrangement of circuits in the wafers, as examples.

Circuitry 15 conveys data to host subsystem 20 over path 18. Circuitry 15 may provide acquired image data such as captured video and still digital images to host subsystem 20.

Electronic device 10 typically provides a user with numerous high level functions. In a computer or advanced cellular telephone, for example, a user may be provided with the ability to run user applications. To implement these functions, electronic device 10 may have input-output devices 22 such as projectors, keypads, input-output ports, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include processors such as microprocessors, microcontrollers, digital signal processors, application specific integrated circuits, etc.

Device 10 may include position sensing circuitry 23. Position sensing circuitry 23 may include, as examples, global positioning system (GPS) circuitry, radio-frequency-based positioning circuitry (e.g., cellular-telephone positioning circuitry), gyroscopes, accelerometers, compasses, magnetometers, etc.

Figure 2:
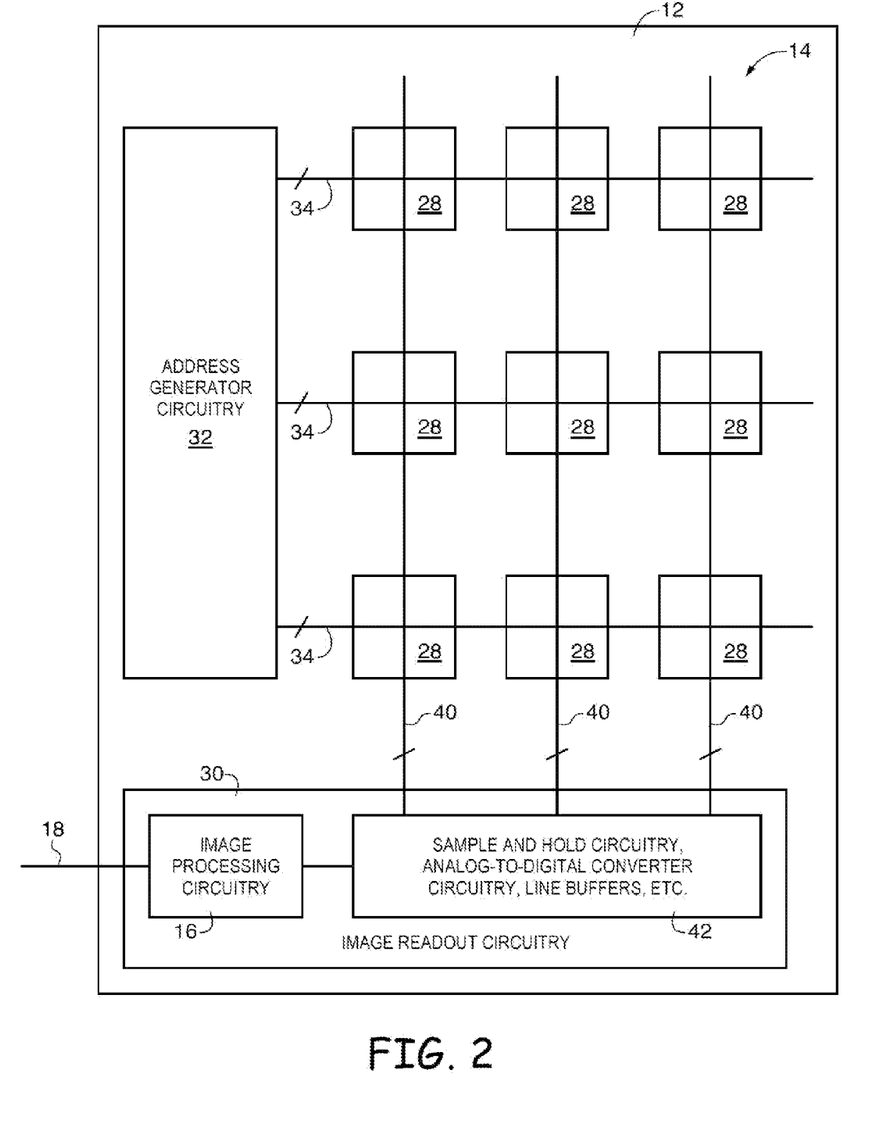
FIG. 2 is a diagram of an illustrative array of light-sensitive imaging pixels that may form an image sensor in the electronic device of FIG. 1 in accordance with embodiments of the present invention.

An example of an arrangement for sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical, rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. With another suitable arrangement, circuitry 42 reads signals from groups of pixels 28 (e.g., groups formed from pixels located in multiple rows and columns of array 14) one group at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

Image sensor pixels 28 may be configured to support global shutter operations. For example, the image pixels may each include a photodiode, floating diffusion region, and a local storage region. With a global shutter scheme, all of the pixels in an image sensor are reset simultaneously. The transfer operation is then used to simultaneously transfer the charge collected in the photodiode of each image pixel to the associated storage region. Data from each storage region may then be read out on a per-row basis.

Figure 3:
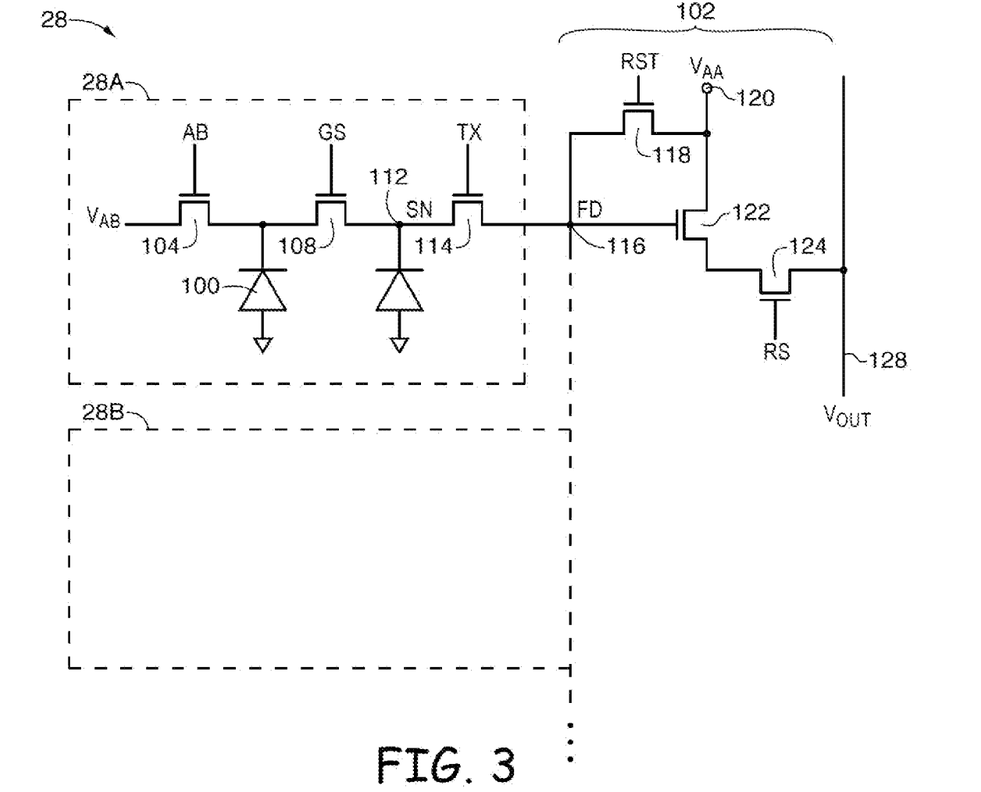
FIG. 3 is a diagram of an illustrative global shutter image sensor pixel that may be used in capturing images with adjustable multiple exposure capabilities in accordance with embodiments of the present invention.

FIG. 3 is a circuit diagram of an illustrative image sensor pixel 28 operable in global shutter mode. As shown in FIG. 2, pixel 28 may include a photosensitive element such as photodiode 100. A first (positive) power supply voltage Vaa may be supplied at positive power supply terminal 120. A second power supply voltage Vab may be supplied at second power supply terminal 106. The power supply voltages Vaa and Vab may, if desired, by similar or even identical and may sometimes be referred to herein as bias voltages. Incoming light may be collected by photodiode 100. Photodiode 100 may then generate charge (e.g., electrons) in response to receiving impinging photons. The amount of charge that is collected by photodiode 100 may depend on the intensity of the impinging light and the exposure duration (sometimes referred to as the integration time).

Before an image is read out, reset control signal RST may be asserted. Asserting signal RST turns on reset transistor 118 and resets charge storage node 116 (also referred to as floating diffusion region FD) to Vaa. Reset control signal RST may then be deasserted to turn off reset transistor 118. Similarly, prior to charge integration, an anti-blooming signal AB (sometimes referred to herein as a global reset signal) may be pulsed high to reset photodiode 100 to power supply voltage Vab (e.g., by passing Vab to photodiode 100 through anti-blooming transistor 104).

Pixel 28 may further include a global shutter transistor 108 operable to transfer charge from photodiode 100 to storage node (sometimes referred to as a charge storage region or storage region) 112 in response to global shutter signal GS. Charge storage region 112 may be a semiconductor diode (e.g., a doped silicon region formed in a silicon substrate by ion implantation, impurity diffusion, or other doping techniques) that is capable of temporarily storing charge transferred from photodiode 100. Region 112 is capable of temporarily storing transferred charge is sometimes referred to as a storage node SN.

Pixel 28 may include a transfer gate (transistor) 114. Transfer gate 114 may have a gate terminal that is controlled by transfer control signal TX. Transfer signal TX may be pulsed high to transfer charge from storage diode region 112 to charge storage region 116 (sometimes called a floating diffusion region). Floating diffusion (FD) region 116 may be a doped semiconductor region (e.g., a region in a silicon substrate that is doped by ion implantation, impurity diffusion, or other doping processes). Floating diffusion region 116 may serve as another storage region for storing charge during image data gathering operations.

Pixel 28 may also include readout circuitry such as charge readout circuit 102. Charge readout circuit 102 may include row-select transistor 124 and source-follower transistor 122. Transistor 124 may have a gate that is controlled by row select signal RS. When signal RS is asserted, transistor 124 is turned on and a corresponding signal Vout (e.g., an output signal having a magnitude that is proportional to the amount of charge at floating diffusion node 116) is passed onto output path 128.

Image pixel array 14 may include pixels 28 arranged in rows and columns. A column readout path such as output line 128 may be associated with each column of pixels (e.g., each image pixel 28 in a column may be coupled to output line 128 through respective row-select transistors 124). Signal RS may be asserted to read out signal Vout from a selected image pixel onto column readout path 128. Image data Vout may be fed to processing circuitry 18 for further processing. The circuitry of FIG. 3 is merely illustrative. If desired, pixel 28 may include other pixel circuitry.

If desired, two or more imaging pixels 28 may share a common charge readout circuit 102. With an arrangement of this type, imaging pixels 28A and 28B may each include a respective anti-blooming transistor 102, a global shutter transistor 108, a transfer transistor 114, photodiode 100, and storage node 112. The floating diffusion node 116 of the common charge readout circuitry 102 may then be coupled to the transfer transistor 114 in pixel 28A and the transfer transistor 114 in pixel 28B. Image readout (and reset operations) may then be adjusted to account for the pixel sharing arrangement. In one implementation, pixels 28A and 28B are located in adjacent rows. Locating pixels 28A and 28B in adjacent columns is also possible, but may involve changes in the readout process and operation of transfer transistor 114. Charge readout circuit 102 may also, if desired, by shared between larger numbers of pixels 28 (e.g., shared between four pixels, shared between six pixels, etc.).

Figure 4:
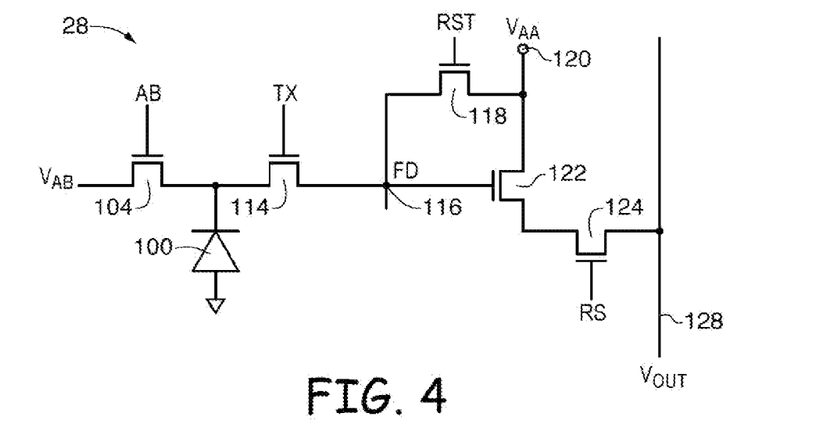
FIG. 4 is a diagram of an illustrative non-global shutter image sensor pixel that may be used in capturing images with adjustable multiple exposure capabilities in accordance with embodiments of the present invention.

A non-global shutter imaging pixel is illustrated in FIG. 4. As shown in FIG. 4, the non-global shutter version (i.e., the rolling shutter version) of imaging pixel 28 is substantially similar to the global shutter version of FIG. 3, except for the removal of global shutter transistor 108 and storage node 112. The removal of these structures somewhat simplifies imaging pixel 28, which will generally reduce the size and cost of imaging pixel 28. As explained below, the remove of these components may somewhat increase the level of readout noise when capturing images with multiple exposures.

Figure 5:
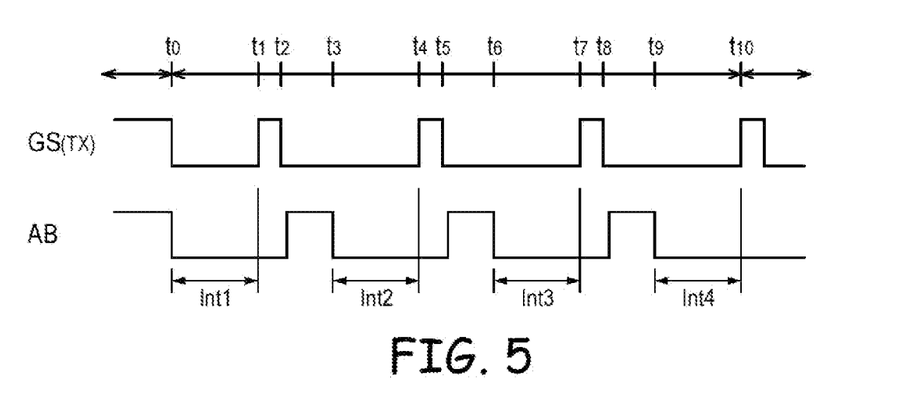
FIG. 5 is a timing diagram showing relevant signal behavior of an illustrative image pixel during an image frame capture and showing how multiple exposures may be adjusted in accordance with embodiments of the present invention.

FIG. 5 is a timing diagram illustrating how selective motion artifacts may be obtained in in pixel 28 using multiple exposures. As shown in FIG. 5, global shutter signal GS and anti-blooming signal AB may be pulsed multiple times during a single image frame. When implemented pixel 28 is a non-global shutter pixel as illustrated in FIG. 4, all references to the global shutter signal GS made in connection with at least FIG. 5 are replaced with the transfer control signal TX.

Prior to time to, anti-blooming signal AB and global shutter signal GS may both be asserted, turning on the associated transistors 104 and 108 (or 114). Simultaneously asserting the anti-blooming signal AB (or transfer control signal TX) and the global shutter signal GS resets photodiode 100 and storage node 112 (or floating diffusion 116, in the FIG. 4 embodiment).

At time $t_0$, the anti-blooming signal AB and the global shutter signal GS may be deasserted and photodiode 100 may begin accumulating charge converted from incident light.

At time $t_1$, the global shutter signal GS may be pulsed. When the global shutter signal GS is asserted, charge from a first integration period Int1 is transferred from photodiode 100 to storage node 112 (or floating diffusion 116, in the FIG. 4 embodiment).

At time $t_2$, the global shutter signal GS may be deasserted and, substantially simultaneously or shortly thereafter, the anti-blooming signal AB may be asserted, thereby resetting photodiode 100.

At time $t_3$, the anti-blooming signal AB may be deasserted and photodiode 100 may once again begin accumulating charge converted from incident light.

At times $t_4$, $t_5$, and $t_6$, the operations of steps $t_1$, $t_2$, and $t_3$, may be repeated (including transferring charge accumulated during a second integration period Int2).

At times $t_7$, $t_8$, and $t_9$, the operations of steps $t_1$, $t_2$, and $t_3$, may be repeated (including transferring charge accumulated during a third integration period Int3).

At time $t_{10}$, the global shutter signal GS may be pulsed to transfer charge accumulated during a fourth (e.g., a final) integration period Int4 from photodiode 100 to storage node 112 (or floating diffusion 116, in the FIG. 4 embodiment). Following the GS pulse at tin, imaging pixel 28 may be read out. In particular, the charge accumulated over multiple integration periods and collected on storage node 112 (or floating diffusion node 116) may be read out of imaging pixel 28.

Reading image data out of the global shutter pixel 28 may involve a correlated double sampling technique. In particular, reset signals RST may first be pulsed to reset floating diffusion node 116. Then and while row select signal RS is asserted, a reset value of floating diffusion node 116 is sampled by readout circuitry coupled to output path 128. After sampling the reset value, transfer control signal TX may be pulsed to transfer the accumulated charge from storage node 112 to floating diffusion node 116. Then and while row select signal RS is asserted, an image data value of floating diffusion node 116 is sampled by readout circuitry coupled to output path 128.

Reading image data out of the non-global shutter pixel 28 of FIG. 4 may, if desired, involve a pseudo correlated double sampling technique. Since accumulated charge has already been transferred onto the floating diffusion node 116 (as described in connection with FIG. 5), it is impossible to sample a reset value prior to sampling the image data value. As a result, a pseudo correlated double sampling technique may involve reading out the image data value, then resetting the floating diffusion node 116, and finally reading out a reset value.

While four integration periods are illustrated in FIG. 5, this is merely an illustrative example. In general, imaging pixels 28 may capture a single frame using any desired number of separate integration periods (e.g., two, three, four, five, ten, or more than ten integration periods may be used).

In at least some situations, image sensor 14 may be configured to capture an image frame of a rapidly moving subject with multiple exposures. The length of each individual exposure (e.g., the time between times $t_0$ and $t_2$) may be determined, based on the speed of motion in the scene being imaged, such that the rapidly moving subject is substantially free of motion blur in individual exposures. Additionally, the delay periods between individual exposures (e.g., the time between times $t_2$ and $t_3$) may be determined, based on the speed of motion in the scene being imaged, such that the rapidly moving subject is in substantially different positions in at least some of the individual exposures. As an example, when image sensor 14 captures an image of a gymnast performing a leap from one to another part of a balance beam, the resulting composited image may show the motion of the gymnast at multiple points of the gymnast's leap. Since each individual exposure may be fast enough to avoid motion blur artifacts, the resulting composited image may include a series of relatively sharp images of the gymnast in various points of their leap. In contrast and if the gymnast's leap were captured by a single long and continuous exposure, the resulting image would show the gymnast as a badly blurred mass moving from the start to ending positions.

In order to capture an image frame of a rapidly moving subject with multiple exposures, where individual exposures are relatively free of motion blur and the composite image captures significant motion of the subject, it may be desirable for the integration periods (e.g., Int1, Int2, etc.) to be a relatively small fraction of the time between the start of the first exposure and the end of the second exposure (i.e., the overall capture period). As an example, consider an arrangement in which a user desires to capture an image with imager 14 with four individual exposures and having an overall capture period of at least 1 second. The shutter speed (i.e., individual integration time Int1. Int2, etc.) may be determined based on factors such as the sensitivity of pixels 28, the amount of light in the scene, the speed at which objects in the scene are moving, etc. The shutter speed may be selected so that individual exposures are relatively free of motion blur. Suppose, for this example, that a shutter speed of 2 milliseconds (1/500 of a second) is suitable. In this example, the integration periods of the individual exposures may be approximately 2 milliseconds and the delay periods between individual exposures may be approximately 250 milliseconds (248 milliseconds, if the user wants an exact 1 second overall capture period).

As demonstrated by the previous example, the delay period is generally much longer than the individual integration (exposure) periods. As examples, the delay period may be at least 2 times, 5 times, 10 times, 100 times, or 1000 times longer than a single individual integration period, as examples. If desired, the length of each delay period may be substantially equal to the length of each individual integration period.

Figure 6:
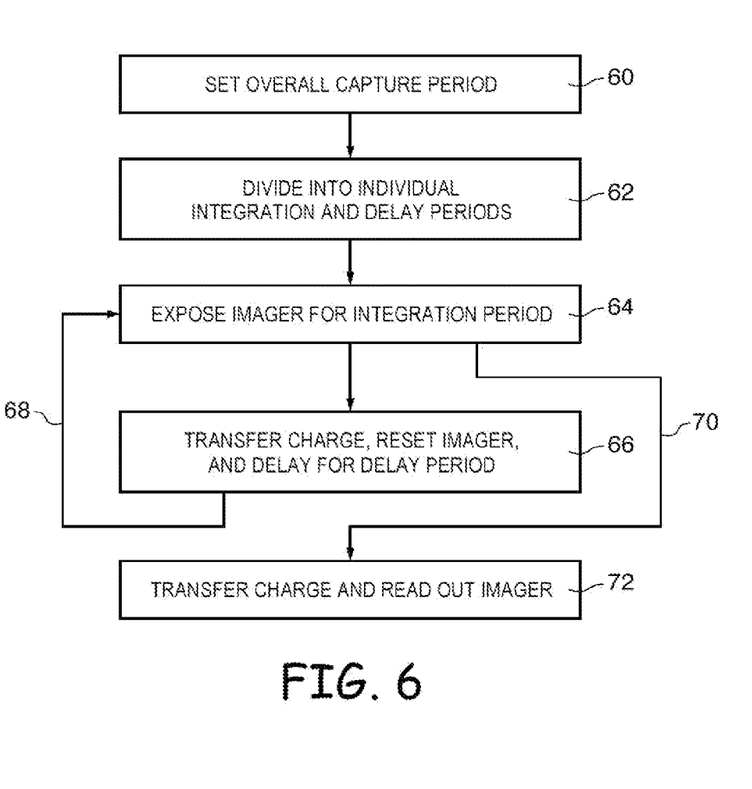
FIG. 6 is a flowchart of illustrative steps involved in adjusting multiple exposures of an imager to capture an image with a desired level of motion artifacts in accordance with embodiments of the present invention.

A flowchart of illustrative steps involved in configuring imager 14 to capture a composite image of a scene with multiple exposures is shown in FIG. 6.

In step 60, an overall capture period for imager 14 may be set. The overall capture period may be determined automatically (e.g., in response to conditions detected by camera 12 such as ambient light levels, the speed of moving objects in the scene, etc.). Alternatively, the overall capture period may be set in response to user input (e.g., device 10 may have a user input device through which user input specifying the overall capture period is received).

In step 62, the overall capture period may be divided into a desired number of individual integration periods separated by delay periods. Similar to the operations of step 60, the number of individual integration periods (and associated delay periods) may be determined automatically or may be specified by a user.

In step 64, the imaging pixels 28 in imager 14 may be exposed for an integration period.

If the just-completed integration period is not the last integration period, step 66 may be performed. In step 66, charge accumulated during the just-completed integration period may be transferred to storage node 112 (or floating diffusion node 116). Then, the imager 14 may enter a delay period prior to the next individual integration period. After the delay period and as illustrated by line 68, a subsequent individual integration exposure may begin in step 64.

If the just-completed integration period is the last integration period and as illustrated by line 70, step 72 may be performed. In step 72, charge accumulated during the last integration period may be transferred to storage node 112 (or floating diffusion node 116). Then, composited image data may be read out from imager 14. If desired, image data may be read out using a correlated double sampling technique or a pseudo-correlated double sampling technique, as described above.

Figure 7:
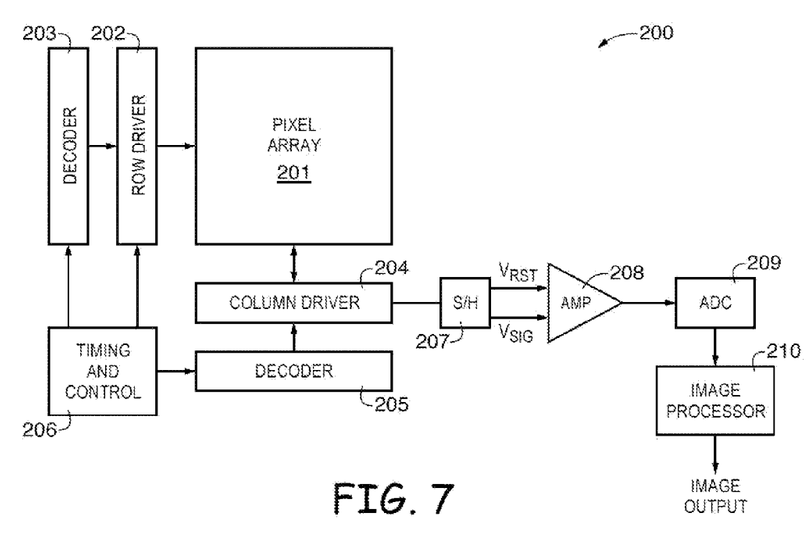
FIG. 7 is a block diagram of an imager employing one or more of the embodiments of FIGS. 1-6 in accordance with embodiments of the present invention.

FIG. 7 illustrates a simplified block diagram of imager 200 (e.g., an imager that may capture a composited image). Pixel array 201 includes a plurality of pixels containing respective photosensors arranged in a predetermined number of columns and rows. The row lines are selectively activated by row driver 202 in response to row address decoder 203 and the column select lines are selectively activated by column driver 204 in response to column address decoder 205. Thus, a row and column address is provided for each pixel.

CMOS imager 200 is operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals, which typically include a pixel reset signal Vrst and a pixel image signal Vsig for each pixel are sampled by sample and hold circuitry 207 associated with the column driver 204. A differential signal Vrst-Vsig is produced for each pixel, which is amplified by amplifier 208 and digitized by analog-to-digital converter 209. The analog to digital converter 209 converts the analog pixel signals to digital signals, which are fed to image processor 210 which forms a digital image.

Figure 8:
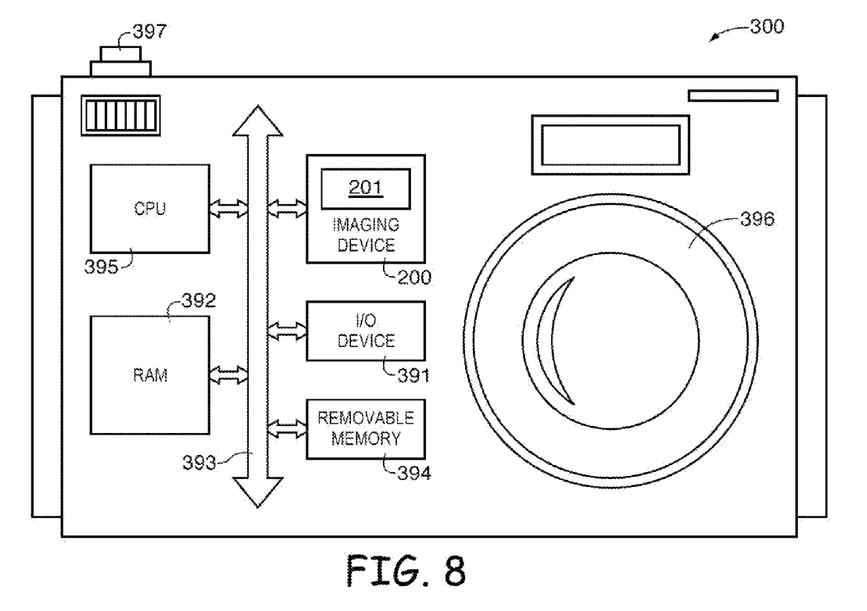
FIG. 8 is a block diagram of a processor system employing the imager of FIG. 7 in accordance with embodiments of the present invention.

FIG. 8 shows in simplified form a typical processor system 300, such as a digital camera, which includes an imaging device such as imaging device 200 (e.g., an imager that may capture a composited image). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging devices. An imaging device may capture a composite image from multiple individual exposures. In each imaging pixel in the imaging device, charge accumulated from each of the individual exposures may be accumulated onto a storage node. The accumulated charge from all of the individual exposures in a single composite image may be read out from the storage node. The individual exposures may be separated by delay periods. The lengths of the individual exposures and delay periods may be determined automatically or set by a user such that each individual exposure is substantially free of motion blur, while the composite image illustrates a moving subject in multiple positions.

The foregoing is merely illustrative of the principles of this invention which can be practiced in other embodiments.

What is claimed is:

1. A method of operating with an image sensing pixel that includes a photodiode, a given transistor coupled between the photodiode and a bias voltage, a charge storage region, a global shutter transistor coupled between the photodiode and the charge storage region, a floating diffusion region, and a transfer transistor coupled between the charge storage region and the floating diffusion region, the method comprising:

with the photodiode, converting incident light into first accumulated charge during a first integration period;

following the first integration period and with the global shutter transistor, transferring the first accumulated charge from the photodiode to the charge storage region;

following the transfer of the first accumulated charge, resetting the photodiode with the given transistor;

after resetting the photodiode, converting incident light into second accumulated charge during a second integration period, wherein the first and second integration periods have substantially equal lengths; and following the second integration period and with the global shutter transistor, transferring the second accumulated charge from the photodiode to the charge storage region such that the first and second accumulated charges are summed in the charge storage region as a combined accumulated charge, wherein resetting the photodiode comprises resetting the photodiode over a delay period, and wherein the delay period is at least a hundred times the length of the first integration period.

2. The method defined in claim 1 further comprising:
with the transfer transistor, transferring the combined accumulated charge from the charge storage region to the floating diffusion region.

3. The method defined in claim 1 further comprising:
with a user input device, receiving user input specifying the length of the delay period.

4. The method defined in claim 1 wherein the first and second integration periods comprise two of at least three integration periods in a composite image, the method further comprising:
with a user input device, receiving user input specifying the number of integration periods in the composite image.

5. The method defined in claim 1 wherein the first and second integration periods comprise two of at least three integration periods in a composite image, wherein the delay period comprises one of a plurality of delay periods, each delay period being between a respective pair of integration periods in the at least three integration periods, and wherein the integration periods together with the delay periods have a length of at least 250 milliseconds.

6. The method defined in claim 1 wherein the image sensing pixel further includes a source-follower transistor having a gate terminal coupled to the floating diffusion node and a source-drain terminal coupled to an output line, the method further comprising:
sensing, over the output line, a voltage output by the source-follower transistor and corresponding to the combined accumulated charge on the floating diffusion region.

7. A method of capturing a multiple exposure composite image, comprising:
determining an overall capture period;
dividing the overall capture period into a plurality of individual exposure times separated by delay periods, wherein each delay period is at least ten times the length of each individual exposure time;
with each imaging sensing pixel in an array of image sensing pixels, accumulating charge on a photodiode during each of the individual exposure times;
with each imaging sensing pixel in the array of image sensing pixels, combining charge accumulated over the plurality of exposure times in a semiconductor diode; and
with image readout circuitry, sensing the combined charge stored in each imaging sensing pixel in the array of image sensing pixels.

8. The method defined in claim 7 wherein determining the overall capture period comprises:
with a user input device, receiving user input specifying the overall capture period.

9. The method defined in claim 7 wherein determining the overall capture period comprises:
identifying a subject of interest;
determining the velocity of the subject of interest; and
determining the overall capture period based on the velocity of the subject of interest.

10. The method defined in claim 7 further comprising:
determining how many individual exposure times the overall capture period is divided into based on user input.

11. The method defined in claim 7 wherein the image sensing pixels comprise global shutter pixels.

12. The method defined in claim 7 wherein the image sensing pixels comprise rolling shutter pixels.

13. A method of capturing a multiple exposure image, comprising:
identifying a subject of interest;
determining the velocity of the subject of interest;
determining an overall capture period based on the velocity of the subject of interest;
based on the velocity of the subject of interest, dividing the overall capture period into a plurality of individual exposure times separated by delay periods, wherein each delay period is at least a hundred times the length of each individual exposure time;
with each imaging sensing pixel in an array of image sensing pixels, accumulating charge on a photodiode during each of the individual exposure times; and
with each imaging sensing pixel in the array of image sensing pixels, combining charge accumulated over the plurality of exposure times in a semiconductor diode.

14. The method defined in claim 13 wherein the image sensing pixels comprise global shutter pixels.

15. The method defined in claim 13, wherein dividing the overall capture period into the plurality of individual exposure times separated by delay periods based on the velocity of the subject of interest comprises determining a length of the plurality of individual exposure times based on the velocity of the subject of interest and determining a length of the delay periods based on the velocity of the subject of interest.

16. The method defined in claim 15, wherein determining the length of the plurality of individual exposure times based on the velocity of the subject of interest comprises determining the length of the plurality of individual exposure times such that the subject of interest is substantially free of motion blur in each individual exposure time.

17. The method defined in claim 16, wherein determining the length of the delay periods based on the velocity of the subject of interest comprises determining the length of the delay periods such that the delay is long enough for the subject of interest to be in substantially different positions in at least some of the plurality of individual exposure times.

18. The method defined in claim 1, wherein the delay period is at least a thousand times the length of the first integration period.

19. The method defined in claim 7, wherein the semiconductor diode comprises a doped silicon region formed in a silicon substrate.

* * * * *